No. 804,772. PATENTED NOV. 14, 1905.
F. G. SAYLOR.
VEHICLE TIRE.
APPLICATION FILED MAR. 28, 1903. RENEWED APR. 11, 1905.
3 SHEETS—SHEET 1.
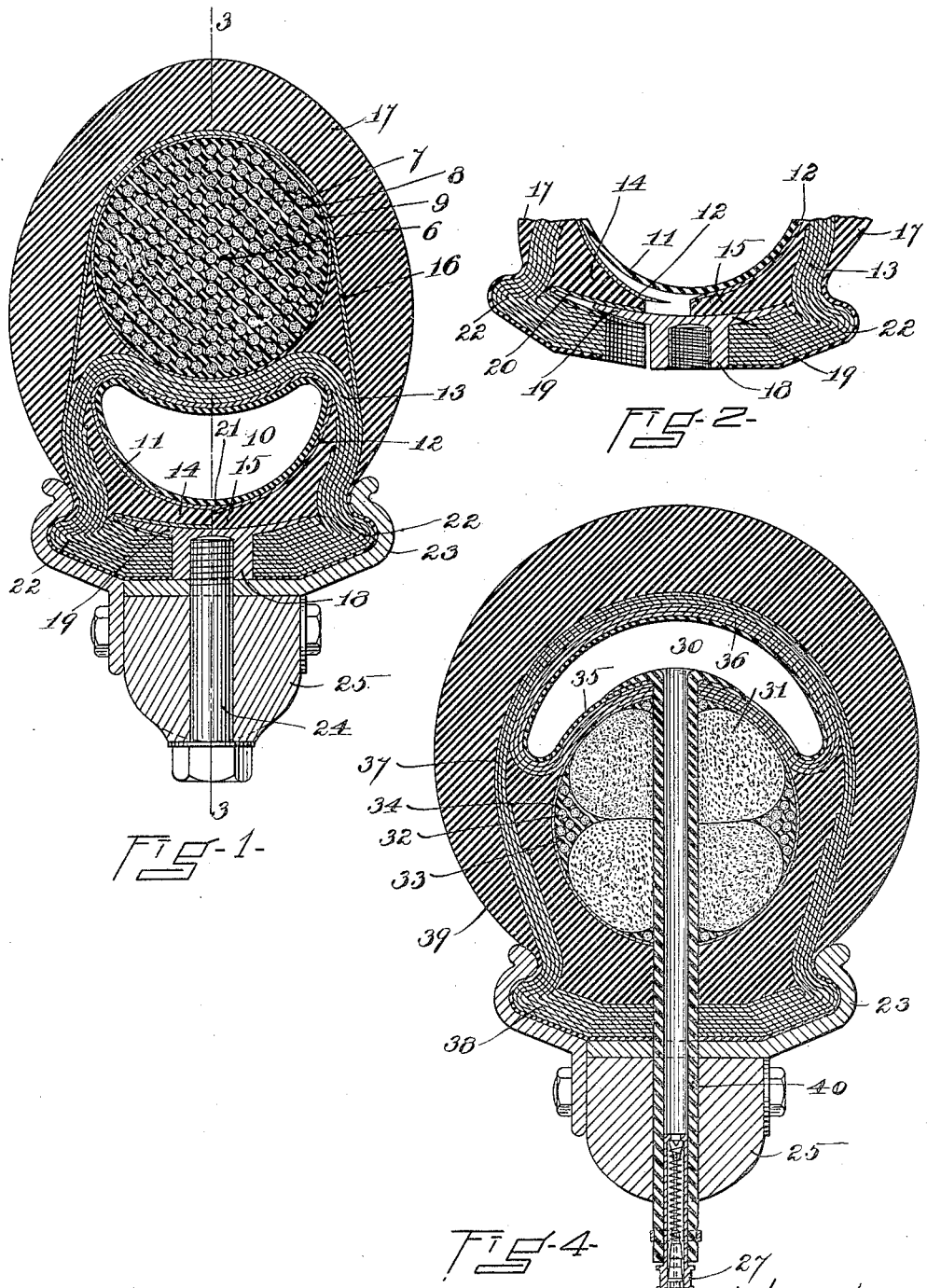
WITNESSES:
Louis A. Jones.
Oscar F. Hill.
INVENTOR:
Franklin G. Saylor
by Wm A. Copeland
attorney

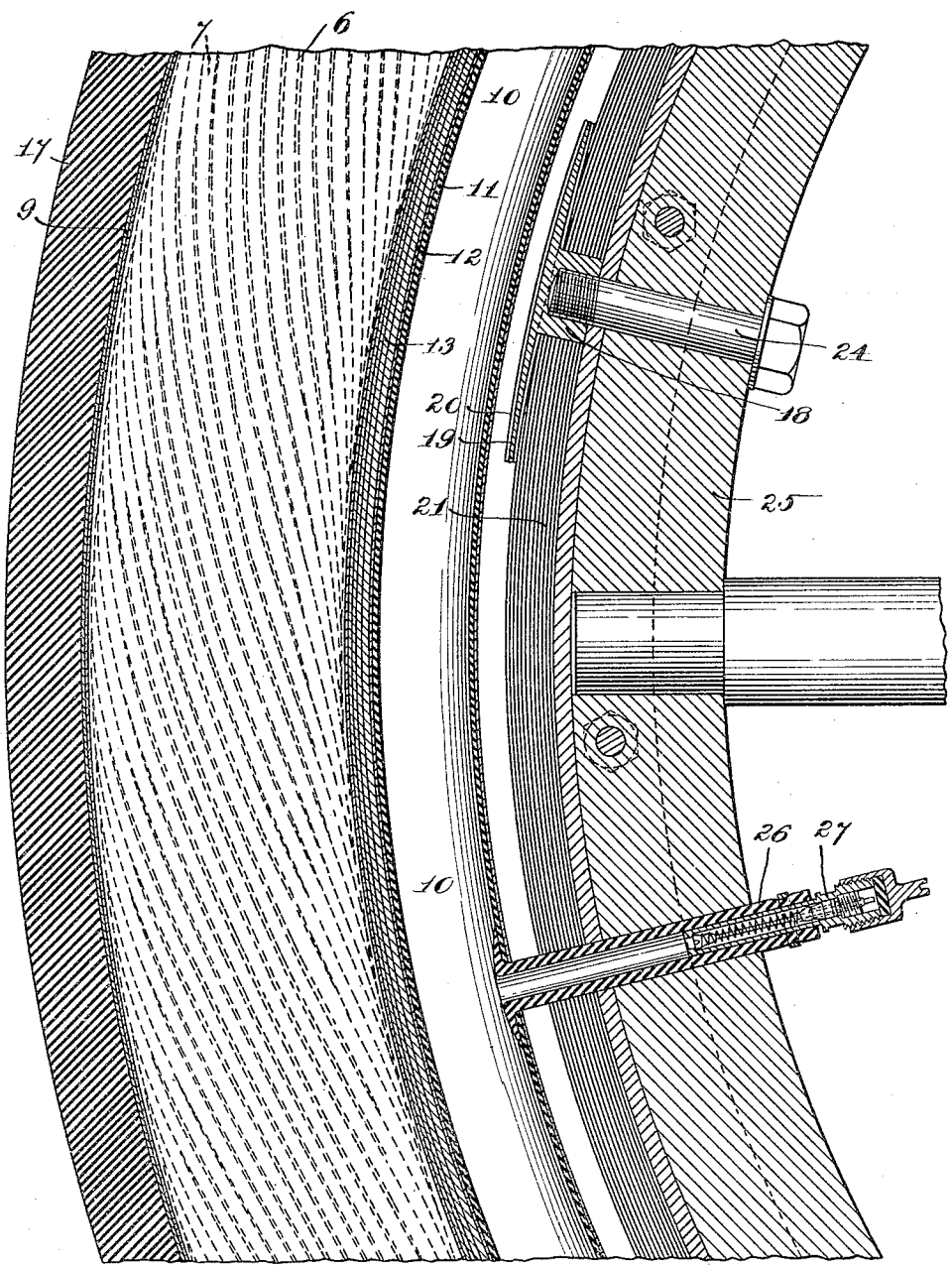

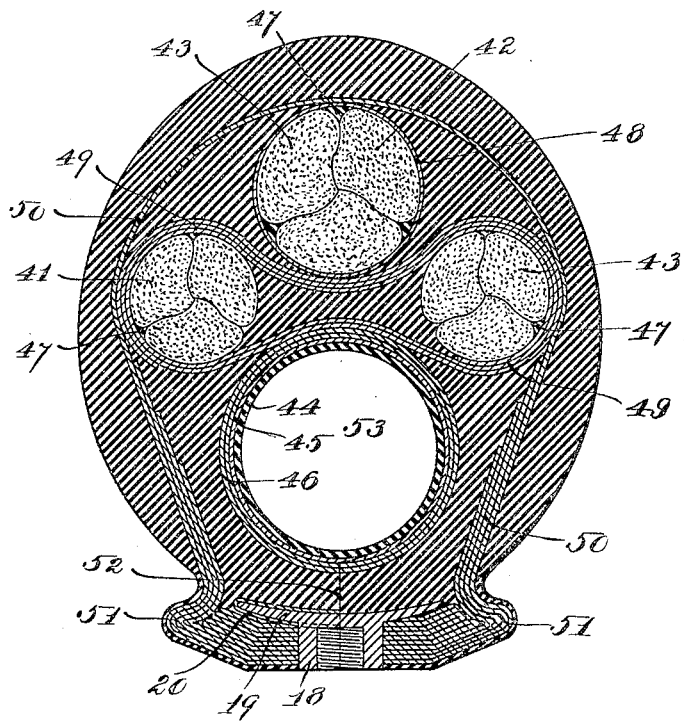

UNITED STATES PATENT OFFICE.

FRANKLIN G. SAYLOR, OF FRANKLIN, MASSACHUSETTS, ASSIGNOR TO M AND S TIRE COMPANY, OF BOSTON, MASSACHUSETTS, A CORPORATION OF MASSACHUSETTS.

VEHICLE-TIRE.

No. 804,772.　　　Specification of Letters Patent.　　　Patented Nov. 14, 1905.

Application filed March 28, 1903. Renewed April 11, 1905. Serial No. 255,009.

*To all whom it may concern:*

Be it known that I, FRANKLIN G. SAYLOR, a citizen of the United States, and a resident of Franklin, in the county of Norfolk and State of Massachusetts, have invented certain new and useful Improvements in Vehicle-Tires, of which the following is a specification.

The general object of the invention is to provide a rubber tire especially adapted for heavy vehicles which shall have great resiliency and at the same time be free from the danger of collapsing as a result of puncture which attends the use of many pneumatic or cushion tires. The invention may, however, be employed in the construction of tires for light vehicles.

One of the special objects of the invention is to attain the above-mentioned result by the use of a core composed in part of fiber and in part of rubber, thereby attaining a higher degree of resiliency than if the core is composed of fiber alone.

Another one of the special objects of the invention is to combine with the core an air-cushion so located as to be protected against all danger of puncture.

Another feature of the invention relates to the means for fastening the tire to the wheel.

The invention will now be fully described by reference to the accompanying drawings, and the novel features thereof will be particularly pointed out in the claims at the close of the specification.

In the drawings, Figure 1 is a cross-section of the rim of a wheel and a tire attached thereto embodying the invention. Fig. 2 is a detail section showing the inner side of the tire spread open at the joint for placing the inner tube in position and showing the manner of placing the securing-lugs in position. Fig. 3 is a vertical section on line 3 3 of Fig. 1, showing a portion of the tire. Fig. 4 is a cross-section showing a modification. Fig. 5 is a cross-section showing another modification.

Referring now especially to Fig. 1 of the drawings, the core 6 is composed of yarns 7, each coated with rubber and wound together to form an endless core and enveloped in a covering 9, of canvas. In the construction of the core the preferred method is to pass the yarns through a reservoir of rubber-cement and then to remove by wipers the surplus cement, allowing sufficient rubber to remain on the yarns to cause the yarns to adhere together when they are wound and form a compact mass. The yarn is wound around a former until the core is built up to the desired size and shape, thus forming an endless core. The core is then enveloped in the covering 9, of canvas. The mechanism for covering the yarn with rubber and for winding it to form the core is not shown in the drawings, because that mechanism forms no part of the present invention. Any suitable mechanism may be employed for the purpose. The core is seated on an air-cushion 10, which in the preferred form of construction (shown in Figs. 1, 2, and 3) is located on that side of the core which is toward the rim and is concaved to form a cradle for the core. The air-cushion is preferably a pneumatic tube 11. The preferred mode of construction is as follows: A metal former of suitable size and shape is covered with a sheet of rubber 12. The former is not shown in the drawings, but would be of the shape and size of the tube 11, which is inserted after the rest of the tire is completed, as will be hereinafter explained. The rubber sheet 12 will form a smooth lining for the canvas and for the rubber body of the tire, inside of which will be the pneumatic tube 11. The edges of the sheet 12 overlap to close the joint, but are uncemented in order that they may be spread apart, as shown in Fig. 2, for taking out the former and inserting the tube 11. A number of layers of canvas 13, each coated with rubber-cement, are placed on the concave side of the former after the former has been covered with the rubber lining. The exact number of the layers of canvas is not material, but will vary according to the weight of the vehicle upon which the tire is intended to be used. The layers of canvas when pressed or rolled will adhere together. The canvas 13 extends around and below the horns of the rubber-covered former. Between the canvas 13 and the lining 12 on the convex side of the air-tube the tire is built up with rubber with a longitudinal division, the adjoining edges 14 15 butting against each other and forming an elastic seat for the convex side of the pneumatic tube. The tire may be spread open along the division to take out the former and insert the pneumatic tube. The core 6 is preferably bound to its seat by canvas 16.

The tire is built up with rubber 17 to the proper shape for the tire outside of the core 6, and the canvas-covered air-cushion and the whole is then vulcanized together. On the inner periphery or rim side of the tire are secured lugs 18 for fastening the tire to the wheel. The preferred method of construction is as follows: The lugs are formed with a flange 19, extending on all sides. Embedded in the tire on one side of the division 21 is a socket-plate 20, which is vulcanized in place and is shaped to receive one half of the flange 19 of the lug 18. The other half of the flange 19 on the opposite side is preferably vulcanized into the body of the tire, so as to retain the lug in place when the tire is opened, as shown in Fig. 2. It is not essential, however, to vulcanize either side of the flange into the tire, and if preferred a socket-plate corresponding to the plate 20 may be employed on both sides. Preferably the canvas which overlies the air-cushion will be brought around each side of the lugs to the division-line 21. The channel side of the tire is preferably built out with extra thicknesses of canvas, forming beds or flanges 22 to fit in the grooves of the channel 23. The precise form of channel is immaterial. The channel side of the tire will therefore be built up to fit whatever form of channel it is to be used with. The tire may be secured to the wheel by bolts 24, which pass through the felly 25 and channel 23 into the lugs 18; but the particular means of fastening the tire to the wheel may be varied. Connected with the pneumatic tube 11 is a valve-tube 26, having a valve 27 for inflating the tire in well-known ways.

In the modification Fig. 4 the air-cushion 30 is shown on the tread side of the core instead of on the rim side, as in Fig. 1, and the core is composed of a rope 31, made in the form of a ring and having the interstices between the readies wormed out with rubber-coated yarns 32, the rubber being indicated by 33, and having a covering of canvas 34. The air-cushion is formed with a pneumatic tube 35 and is protected by reinforcings of canvas 36. Surrounding the canvas-covered convex portion of the air-cushion are other layers of convas 37, which are carried through the wall and are brought around to the division line or joint on the rim side. The number of layers may be varied according to circumstances; but preferably the flanged base 38 should be composed of a greater thickness or number of layers of canvas than is required in the interior. The tire is built up with rubber 39 outside of the core and air-cushion, and the whole is vulcanized together. On account of the air-cushion being placed on that side of the core which is toward the tread side of the tire the valve-tube 40 passes through the core. In order to show the valve-tube, the section Fig. 4 is taken through the valve-tube, and therefore does not show the lugs for fastening the tire to the wheel; but lugs may be attached to this form of tire in the same way as in Fig. 1. Instead of having a single core there may be a plurality of smaller cores, and instead of having the air-cushion crescent-shaped it may be cylindrical.

In the modification Fig. 5 three cores 41 42 43 are shown grouped toward the tread side of the tire, and the air-cushion 53 is shown between the cores and the rim side of the tire. The air-cushion shown in this modification is cylindrical instead of crescent-shaped. It is formed with a pneumatic tube 44, having a covering of rubber 45, which forms a lining between the tube 44 and the canvas coverings 46. The cores 41 42 43 may be each formed of rope, with rubber 47 wormed into the interstices, as in Fig. 4, or they may be each formed as in Fig. 1. In this form of construction having three cores arranged as shown it is preferable to not only have a covering of canvas 48 around the core 42, but to bind together the two cores 41 and 43 by canvas bands 49, which will also form a cradle for the middle core 42 and for the air-cushion 53. It is also preferred to have a canvas band 50 passing around all of the cores and carried through the side to form the flange 51, which is to fit in the channel. The tire is formed with an open joint 52, as in the other forms described, and is provided with lugs 18 and socket-plates 20, as in Fig. 4. It may be provided with a valve-tube in the same manner as in Fig. 3. The inner or pneumatic tube 44 may be removed, as in Figs. 1, 2, and 3.

It is obvious that the crescent form of air-cushion shown in Fig. 1 or in Fig. 4 might be employed in combination with a plurality of cores and that the number of cores might be either two, three, or more. It is also obvious that the canvas reinforce can be varied in arrangement.

A tire having a core composed in whole or in part of yarns coated with rubber-cement, even without the air-cushion, will be much more resilient than if the core is wholly fibrous and comes within the scope of the invention. A tire having a core of which no part is rubber or no part fiber, but having an air-cushion, will also give good results and comes within the scope of the invention; but the best results are obtained by the use of a core composed of rubber and fiber in combination with an air-cushion.

What I claim is—

1. A rubber tire having a core formed at least in part of rubber-coated yarns wound together, substantially as described.

2. A rubber tire having a core composed in whole or in part of rubber-coated yarns wound together, an air-cushion for the core and rubber walls surrounding the core and cushion, substantially as described.

3. A rubber tire having a core, an air-cushion for the core, rubber surrounding the core and air-cushion and divided longitudinally on the rim side of the tire to permit spreading the wall open and gain admission to the air-chamber, flanged lugs for fastening the tire to a wheel, and socket-plates embedded in the tire at the side of the division to receive the flange of the lug, substantially as described.

4. A rubber tire having a core, an air-cushion for the core on the rim side thereof, the said cushion having the side which is toward the core made concave, layers of canvas between the core and the concave side of the cushion, and rubber walls surrounding the core and air-cushion.

5. A rubber tire having a core, an air-cushion for the core, rubber surrounding said core and air-cushion and divided longitudinally on the rim side of the tire to permit spreading of the wall and gaining admission to the air-chamber, and securing-lugs for fastening the tire to a wheel, having flanges which engage with the tire on the inside thereof and having a body which passes out through the division-opening for connection with the rim.

In testimony whereof I have affixed my signature in presence of two witnesses.

FRANKLIN G. SAYLOR.

Witnesses:
WILLIAM A. COPELAND,
ROBERT WALLACE.